United States Patent
Metelues et al.

(10) Patent No.: US 6,964,320 B2
(45) Date of Patent: Nov. 15, 2005

(54) LUBRICATION ARRANGEMENT FOR FINAL DRIVE UNIT

(75) Inventors: Frank Metelues, Maumee, OH (US); Christopher David Marks, Fort Wayne, IN (US); William J. Hamm, Fort Wayne, IN (US); Arnaldo R. Bassaco, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 41 days.

(21) Appl. No.: 10/352,054

(22) Filed: Jan. 28, 2003

(65) Prior Publication Data

US 2004/0144597 A1 Jul. 29, 2004

(51) Int. Cl.⁷ .............................. F01M 3/00
(52) U.S. Cl. .................. 184/6.2; 184/6.4; 184/6.12
(58) Field of Search ................. 194/6.2, 6.4, 6.12, 194/6.13, 11.1, 13.1

(56) References Cited

U.S. PATENT DOCUMENTS

| | | | |
|---|---|---|---|
| 3,851,731 A * | 12/1974 | Jorgensen | 184/6.2 |
| 4,227,427 A | 10/1980 | Dick | |
| 4,231,266 A | 11/1980 | Nishikawa et al. | |
| 4,271,717 A | 6/1981 | Millward et al. | |
| 4,274,298 A | 6/1981 | Ostrander | |
| 4,656,885 A | 4/1987 | Hori et al. | |
| 4,674,457 A * | 6/1987 | Berger et al. | 123/196 R |
| 4,677,871 A | 7/1987 | Taniyama et al. | |
| 4,824,264 A | 4/1989 | Hoebel | |
| 4,842,100 A * | 6/1989 | Cameron et al. | 184/6.2 |
| 5,014,819 A * | 5/1991 | Gotou et al. | 184/6.2 |
| 5,050,447 A | 9/1991 | Hayakawa et al. | |
| 5,125,876 A * | 6/1992 | Hirota | 475/231 |
| 5,273,136 A | 12/1993 | Martin et al. | |
| 5,404,963 A | 4/1995 | Crepas et al. | |
| 6,086,343 A * | 7/2000 | Sun et al. | 418/55.6 |
| 6,244,386 B1 | 6/2001 | Takasaki et al. | |
| 6,779,421 B2 * | 8/2004 | Arnold et al. | 74/730.1 |
| 2002/0173398 A1 * | 11/2002 | Arnold et al. | 475/72 |

FOREIGN PATENT DOCUMENTS

GB 2 208 689 A 4/1989

* cited by examiner

*Primary Examiner*—David M. Fenstermacher
(74) *Attorney, Agent, or Firm*—Berenato, White & Stavish

(57) ABSTRACT

A final drive unit for a motor vehicle includes a carrier housing integrally formed with a final drive housing and provided to store a lubricating oil therein, a pinion drive shaft rotatably supported within the final drive housing by a pair of bearings, an oil supply passage formed integrally with the final drive housing for lubricating the bearings and having a supply opening in communication with a cavity in the carrier housing, and a baffle member mounted within the carrier housing adjacent to the supply opening of the oil supply passage. The baffle member includes a baffle wall provided to cover a lower portion of the oil supply passage for maintaining a portion of the lubrication oil within the oil supply passage so as to permit the lubricating oil to adequately lubricate the bearings even when the motor vehicle is tilted to a maximum angle of inclination.

16 Claims, 3 Drawing Sheets

LUBRICATION ARRANGEMENT FOR FINAL DRIVE UNIT

BACKGROUND OF THE INVENTION

1. Field of the Invention

The present invention relates to final drive units of vehicular drive axle assemblies and, more particularly, to a lubrication arrangement for use in the final drive unit which can provide good lubrication of bearings supporting a pinion drive shaft within a carrier housing of the vehicular drive axle assembly even when a vehicle body is in an inclined state.

2. Description of the Prior Art

Conventionally, final drive units well known in the prior art, are arranged in a power transmission system of a motor vehicle to allow a pair of output shafts operatively coupled to a propeller shaft.

The typical lubrication apparatus used in the final drive unit for motor vehicles includes a carrier elongated in a fore-and-aft direction of the motor vehicle and receiving lubricating fluid, a differential case arranged at a rear end of the casing, a differential gear unit rotatably disposed within the differential case, a drive gear mounted to the differential case, and a drive pinion shaft that is formed with a drive pinion meshing with the drive gear. The drive pinion shaft is elongated forward to be connected with a front-wheel side trans-axle via a propeller shaft. The drive pinion shaft is rotatably supported by a pair of axially spaced outer and inner tapered roller bearings. With this arrangement, when the motor vehicle is in a normal horizontal position, the roller bearings are immersed in the lubricating fluid to be sufficiently lubricated. Typically, the outer bearing pumps the lubricating oil into a cavity between the two bearings. This pumping action allows the outer bearing which is subject to the larger amount of drive torque to be well lubricated. However, when the motor vehicle runs on a decent and/or ascent, the lubricating oil is not getting to the bearings due to gravity. In this situation the lubricating oil must be pushed up hill to the space between the outer bearing and a seal. The lack of the lubricating oil necessary for positive lubrication of the roller bearings, especially acute at low speed of the motor vehicle, may be very detrimental for the bearings of the final drive unit.

Accordingly, it is the intent of this invention to overcome these shortcomings of the prior art.

SUMMARY OF THE INVENTION

The present invention provides a lubrication arrangement for use in a final drive unit of a motor vehicle which can provide continuous and adequate lubrication of bearings supporting a pinion drive shaft within a carrier housing of a vehicular drive axle assembly even when a vehicle body is in an inclined state and moving at a low speed.

The final drive unit of the motor vehicle in accordance with the preferred embodiment of the present invention includes a carrier housing integrally formed with a final drive housing and defining a main chamber provided to store an amount of lubricating oil therein, a ring gear disposed within the main chamber of the carrier housing for rotation therewithin and causing the lubricating oil to circulate when rotated, a pinion drive shaft rotatably supported within the final drive housing by a pair of axially spaced outside and inside bearings, an oil supply passage formed integrally with the final drive housing for lubricating the outside and inside bearings, wherein the oil supply passage has a supply opening in communication with the main chamber of the carrier housing.

The final drive unit of the present invention further includes a baffle member mounted within the carrier housing adjacent to the supply opening of the oil supply passage. The baffle member includes a baffle wall provided to cover a lower portion of the oil supply passage for maintaining some lubrication oil within the oil supply passage so as to permit the lubricating oil to lubricate the outside and inside bearings even when the motor vehicle is tilted to a maximum angle of inclination with respect to a horizon. The baffle member further includes a deflector lip formed in a top portion of the baffle member and extending from the baffle member toward the ring gear. The deflector lip is positioned adjacent to the ring gear and provided for deflecting the lubricating oil axially outward from the ring gear toward the supply opening of the oil supply passage. Preferably, the baffle member is formed integrally with the baffle wall and the deflector lip as a unitary single-piece part. Moreover, an access opening is formed in the baffle member between the deflector lip and the baffle wall for allowing lubricating oil flow from the main chamber in the carrier housing into the oil supply passage through the supply opening.

The final drive unit further includes a first lateral opening providing fluid communication between the oil supply passage and a space within the final drive housing between the outer roller bearing and an outer end thereof and a second lateral opening providing fluid communication between the oil supply passage and the space within the final drive housing between the outer roller bearing and the inner roller bearing.

Therefore, the lubrication arrangement of final drive unit in accordance with the present invention includes a novel baffle member providing continuous and adequate lubrication of the pinion drive shaft bearings at various speeds and angles of inclination of the motor vehicle.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
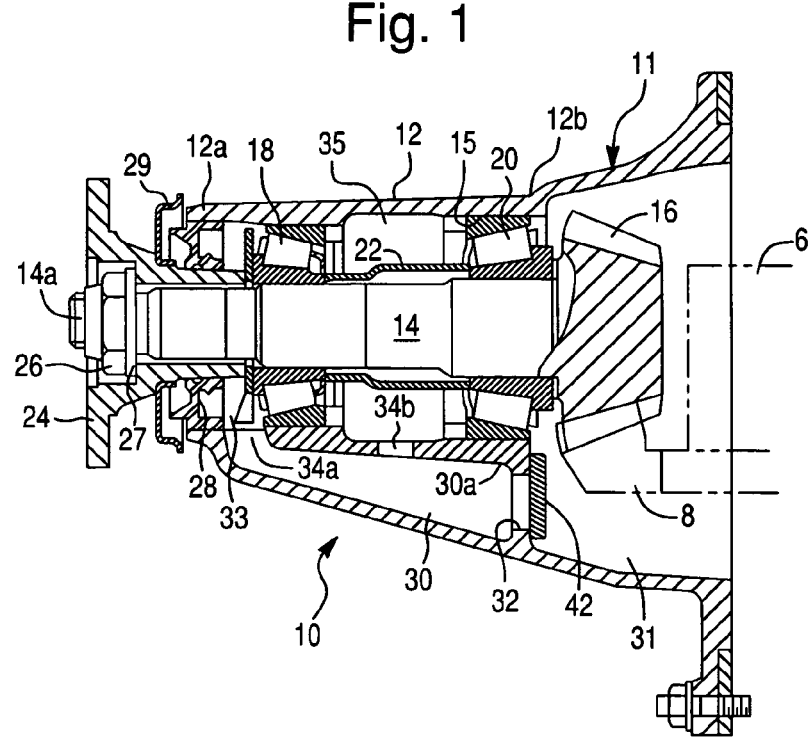
FIG. 1 is a horizontal sectional view of a final drive unit and differential assembly in a carrier housing in accordance with the present invention.
Figure 2:
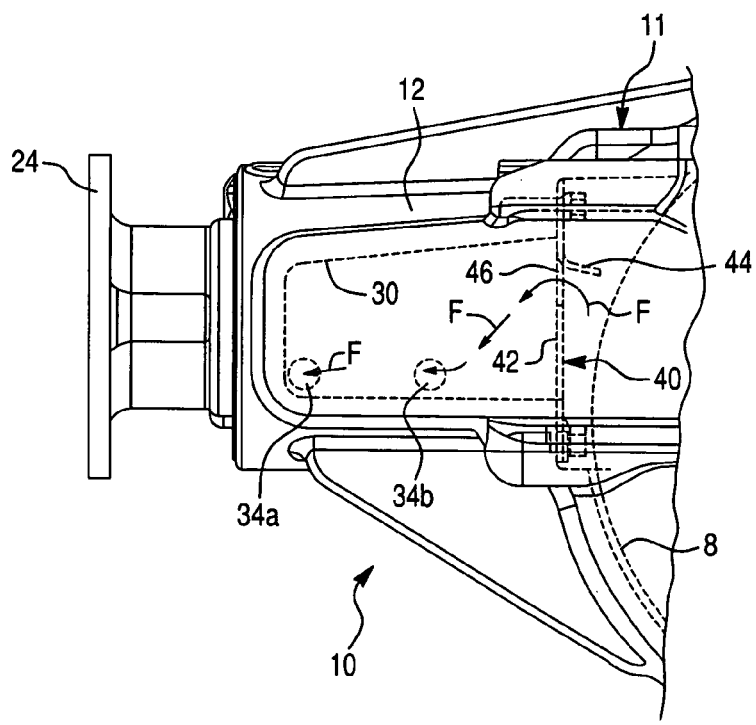
FIG. 2 is a side view of the final drive unit in the carrier housing in accordance with the present invention.

FIGS. 1 and 2 schematically depicts a final drive unit 10 of a front drive axle assembly of a four-wheel drive motor vehicle. However, it is to be understood that while the present invention is described in relation to the final drive unit 10 of the front drive axle assembly, the present invention is equally suitable for use in rear drive axle assembly of the two-wheel drive or four-wheel drive motor vehicle.

As illustrated in FIGS. 1 and 2, the final drive unit 10 for the motor vehicle of the front engine, front wheel drive type. The final drive unit comprises a generally hollow carrier housing 11 integrally formed with a final drive housing 12 being in the form of a generally cylindrical support structure elongated in a fore-and-aft direction of a vehicle body (not shown). The carrier housing 11 is arranged to be coupled with an axle housing or opposite axle tubes (not shown) in a fluid-tight manner to store an amount of lubricating oil therein, a differential gear assembly 6 (shown in FIG. 2) rotatably mounted within the carrier housing 11, a ring gear 8 contained within the carrier housing 11 and mounted on the differential gear assembly 6 for rotation therewith, and a drive pinion shaft 14 rotatably supported by a pair of axially spaced outer and inner tapered roller bearings 18 and 20 respectively, mounted within a substantially cylindrical inner peripheral surface 15 of the final drive housing 12 and positioned in place by means of a cylindrical spacer 22. The drive pinion shaft 14 is integrally provided at its inner end with a hypoid pinion gear 16 which is located in the interior of carrier housing 11 and permanently in mesh with the ring gear 8. The drive pinion shaft 14 extends outwardly from the final drive housing 12 of carrier housing 11.

In the above arrangement, a companion flange 24 is splined to the drive pinion shaft 14 and fixed in place by means of a fastening nut 26 threaded over a distal end 14a of the drive pinion shaft 14 through a washer 27. An annular oil seal member 28 is fixedly mounted within an outer end portion 12a of the final drive housing 12 forming an outer end thereof and is in surrounding relationship with a sleeve portion of the companion flange 24 to close an interior of the final drive housing 12 in a fluid-tight manner. An annular dust deflector 29 is fixed to a neck portion of the companion flange 24 to contain therein an outer end of the oil seal member 28.

As illustrated in FIGS. 1 and 2, the final drive housing 12 of the carrier housing 11 is formed on one side wall thereof with an oil supply passage 30 (illustrated by dotted line in FIG. 2). The oil supply passage 30 is arranged substantially in parallel with the drive pinion shaft 14 at the same side as the ring gear 8 of the differential assembly 6. The oil supply passage 30 opens at a rear end thereof into a main chamber 31 of the carrier housing 11 in which the differential assembly 6 and the lubricating oil are contained, through a supply opening 32 provided at an inner end 30a of the oil supply passage 30. The ring gear 8 is partially immersed in the lubricating oil within the main chamber 31 of the carrier housing 11.

As further illustrated in FIGS. 1 and 2, the oil supply passage 30 is in fluid communication at its front end with a substantially annular space 33 within the final drive housing 12 of the carrier housing 11 around the drive pinion shaft 14 between the outer roller bearing 18 and the oil seal member 28 through a first lateral opening 34a. The oil supply passage 30 further opens at its intermediate portion into a substantially annular space 35 within the final drive housing 12 of the carrier housing 11 around the drive pinion shaft 14 between the outer roller bearing 18 and the inner roller bearing 20 through a second lateral opening 34b.

Figure 3:
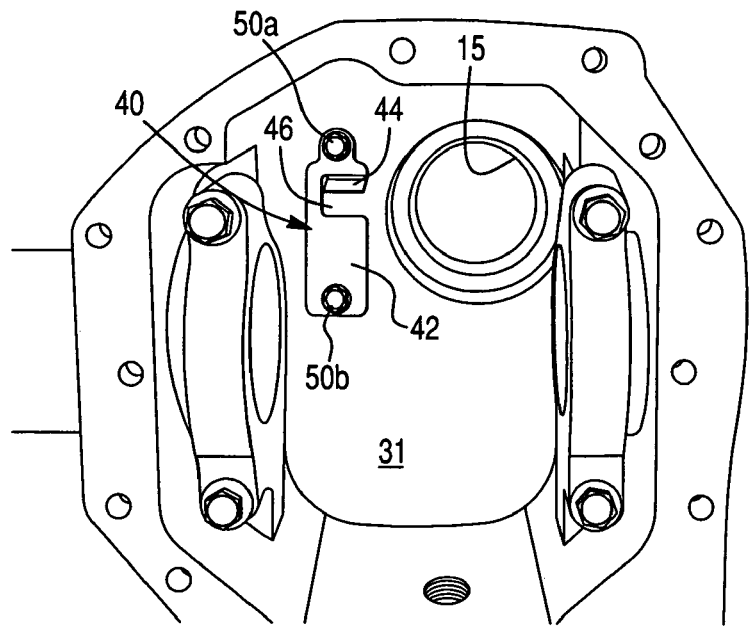
FIG. 3 is a rear view of the carrier housing with a baffle member mounted thereon in accordance with the present invention.
Figure 4:
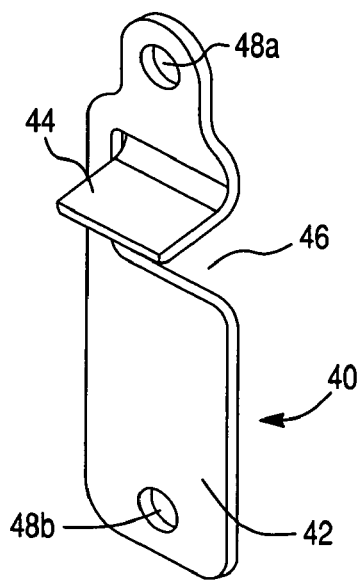
FIG. 4 is a perspective view of the baffle member in accordance with the preferred embodiment of the present invention.

The supply opening 32 is covered with a baffle member 40 fastened to the carrier housing 11, preferably through bolts 50a and 50b, as illustrated in FIGS. 2 and 3. It will be appreciated by those skilled in the art that any other appropriate manner of securing the baffle member 40 to the carrier housing 11 is within the scope of the present invention. The baffle member 40, illustrated in detail in FIG. 4, includes a baffle wall 42 provided with a deflector lip 44 at an upper portion thereof. As illustrated, the deflector lip 44 is provided at a top portion of the baffle member 40 and extends from the baffle wall 42 toward the ring gear 8 of the differential assembly 6, thus forming an access opening 46 in the baffle member 40 allowing the lubricating oil flow into the oil supply passage 30. At the same time, the baffle wall 42 of the baffle member 40 covering a lower portion of the oil supply passage 30 serves as an oil dam to store an amount of the lubrication oil within the oil supply passage 30 for providing uninterrupted supply of the lubricating oil to the outer and the inner roller bearings 18 and 20 through the lateral openings 34a and 34b. The deflector lip 44 of the baffle member 40 assists in deflecting a flow of the lubricating oil into the oil supply passage 30 through the access opening 46 in the baffle member 40. Preferably, the baffle member 40 is formed integrally with the baffle wall 42 and the deflector lip 44 as a unitary, single-piece part using a metal stamping process. It will be appreciated by those skilled in the art that the baffle member 40 may be manufactured by any other appropriate process, such as molding, casting, welding, etc., from any appropriate, such as steel, aluminum, plastic, etc.

As viewed in FIG. 2, the ring gear 8 is adapted to rotate clockwise when the associated vehicle is moving forward. In operation, when the drive pinion shaft 14 is applied with a drive torque from a prime mover of the motor vehicle to rotate the ring gear 8 in a clockwise direction A, the lubricating oil is picked up by rotation of the ring gear 8 and thrown tangentially to the direction of rotation thereof against the deflector lip 44 of the baffle member 40. Similarly, the pinion gear 16 picks up some of the lubricating oil and throws it tangentially to the direction of rotation thereof against the deflector lip 44 of the baffle member 40. The deflector lip 44 redirects (deflects) the flow of the lubricating oil into the oil supply passage 30 through the access opening 46 in the baffle member 40, as indicated by an arrow F in FIG. 2 depicting the flow of the lubricating oil when the ring gear 8 is rotated in the clockwise or forward direction A. Thus, the deflector lip 44 of the baffle member 40 provides an adequate lubricating oil flow into the oil supply passage 30 at various speeds of the motor vehicle and angles of inclination of the motor vehicle on a slope.

Figure 5:
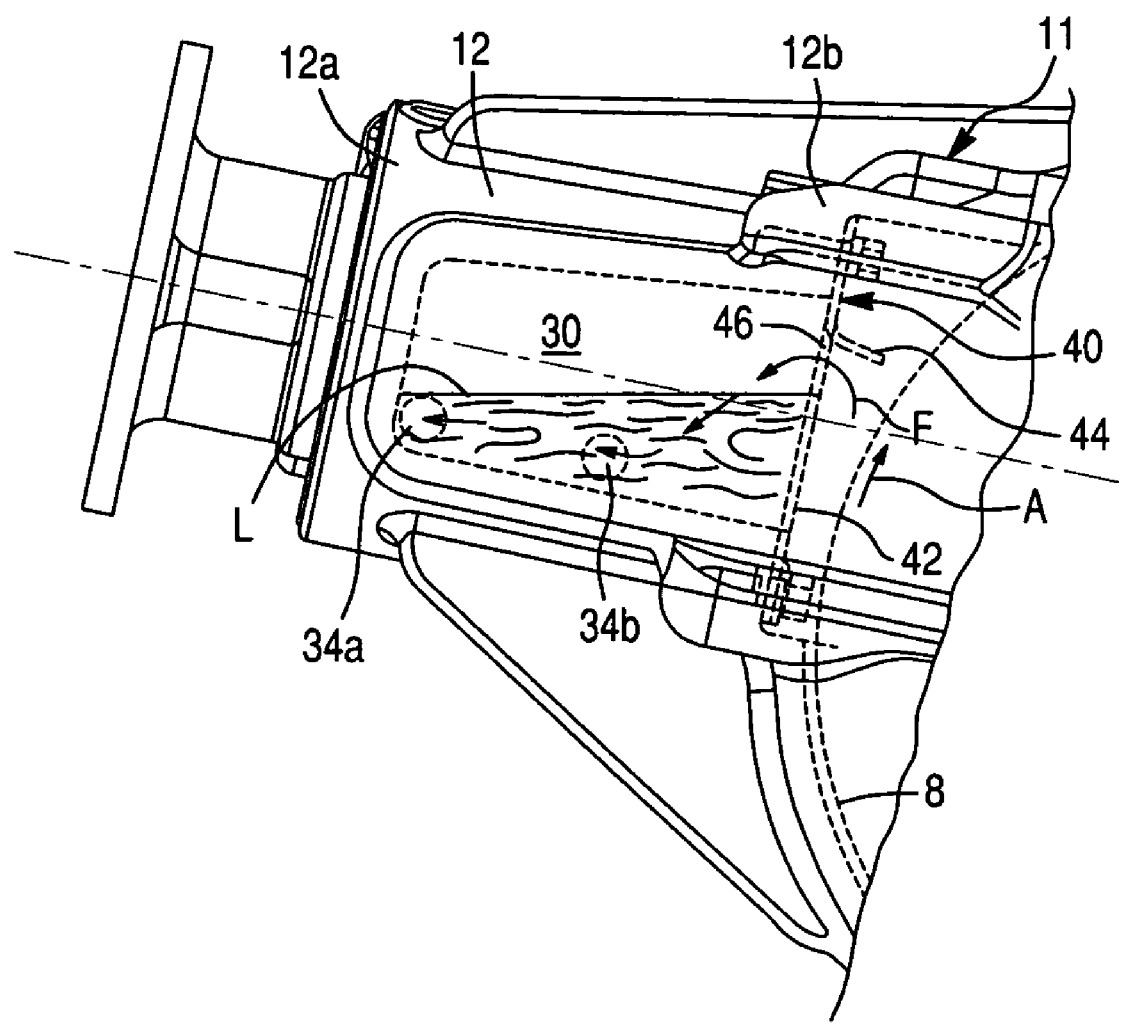
FIG. 5 is a side view of the final drive unit in the carrier housing in accordance with the present invention in a position when the carrier housing is tilted to a maximum angle of inclination with respect to a horizon.

As further shown in FIG. 5, the baffle wall 42 of the baffle member 40 prevents some lubricating oil from flowing back to the main chamber 31 of the carrier housing 11 from the oil supply passage 30, thus acting as the oil dam.

When the motor vehicle runs on a descent, a vehicle body is in a forwardly inclined state in which an inner end portion 12b of the final drive housing 12 of the front drive axle is positioned lower than the outer end portion 12a thereof relative to the line of the horizon. In such a condition, the lubricating oil tends to leave the oil supply passage 30 back into the main chamber 31 of the carrier housing 11 due to the gravity of the lubricating oil. However, the baffle wall 42 of the baffle member 40 prevents some lubricating oil from flowing back to the main chamber 31 of the carrier housing 11 from the oil supply passage 30 as it acts as the oil dam, thus keeping the first and second lateral openings 34a and 34b submersed in the lubricating oil and providing continuous lubrication of the outside and inside bearings 18 and 20 even when the motor vehicle runs on a decent and tilted to a maximum angle of inclination with respect to a horizon, as illustrated in FIG. 5, wherein a level of the lubricating oil within the oil supply passage 30 is indicated by the dash line L. Here, the maximum angle of inclination should be understood as a critical angle providing stability of the motor vehicle on a slope. Therefore, the baffle wall 42 of the baffle member 40 is provided to slow the rate of lubricating oil leaving the oil supply passage 30 back into the main chamber 31 of the carrier housing 11 due to the gravity of the lubricating oil and keeping the first and second lateral openings 34a and 34b submersed in the lubricating oil.

It will be appreciated by those of ordinary skill in the art that height of the baffle wall 42 of the baffle member 40 can be varied to accommodate various angles of inclination of the motor vehicle.

Therefore, the lubrication arrangement of the final drive unit in accordance with the present invention includes a novel baffle member providing continuous and adequate lubrication of the pinion drive shaft bearings at various speeds and angles of inclination of the motor vehicle.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A final drive unit for a motor vehicle axle assembly, said final drive unit comprising:
   a carrier housing integrally formed with a final drive housing and defining a main chamber provided to store an amount of lubricating oil therein;
   a pinion drive shaft rotatably supported within said final drive housing by a pair of axially spaced outside and inside bearings;
   an oil supply passage formed integrally with said final drive housing for lubricating said outside and inside bearings, said oil supply passage having a supply opening in communication with said main chamber of said carrier housing; and
   a baffle member mounted within said carrier housing adjacent to said supply opening of said oil supply passage, said baffle member including a baffle wall provided to cover a lower portion of said oil supply passage for maintaining a portion of said amount of said lubrication oil within said oil supply passage so as to permit said lubricating oil to continuously and adequately lubricate said outside and inside bearings even when said motor vehicle is tilted to a maximum angle of inclination with respect to a horizon, said maximum angle being a critical angle for stability of said motor vehicle on a slope.

2. The final drive unit as defined in claim 1, further including at least one lateral opening providing fluid communication between said oil supply passage and a space within said final drive housing.

3. The final drive unit as defined in claim 2, further including a first lateral opening providing fluid communication between said oil supply passage and a space within said final drive housing between said outer roller bearing and an outer end thereof and a second lateral opening providing fluid communication between said oil supply passage and said space within said final drive housing between said outer roller bearing and said inner roller bearing.

4. The final drive unit as defined in claim 1, further including a ring gear disposed within said main chamber of said carrier housing for rotation therewithin and causing said lubricating oil to circulate when rotated, wherein said baffle member further including a deflector lip extending from said baffle wall toward said ring gear and provided for deflecting said lubricating oil axially outward from said ring gear toward said supply opening of said oil supply passage.

5. The final drive unit as defined in claim 4, wherein said baffle member further including an access opening provided between said deflector lip and said baffle wall for providing a fluid communication between said main chamber of said carrier housing and said oil supply passage through said supply opening.

6. The final drive unit as defined in claim 4, wherein said deflector lip is formed in a top portion of said of said baffle member and positioned adjacent to said ring gear.

7. The final drive unit as defined in claim 4, wherein said baffle member is formed integrally with said baffle wall and said deflector lip as a unitary single-piece part.

8. The final drive unit as defined in claim 5, wherein said deflector lip of said baffle member is provided for deflecting said lubricating oil axially outward from said ring gear toward said access opening in said baffle member.

9. A final drive unit for a motor vehicle axle assembly, said final drive unit comprising:
   a carrier housing integrally formed with a final drive housing and defining a main chamber provided to store an amount of lubricating oil therein;
   a ring gear disposed within said main chamber of said carrier housing for rotation therewithin and causing said lubricating oil to circulate when rotated;
   a pinion drive shaft rotatably supported within said final drive housing by a pair of axially spaced outside and inside bearings;
   an oil supply passage formed integrally with said final drive housing for lubricating said outside and inside bearings, said oil supply passage having a supply opening in communication with said main chamber of said carrier housing; and
   a baffle member mounted within said carrier housing adjacent to said supply opening of said oil supply passage, said baffle member further including a deflector lip extending from said baffle member toward said ring gear and provided for deflecting said lubricating oil axially outward from said ring gear toward said supply opening of said oil supply passage.

10. The final drive unit as defined in claim 9, wherein said deflector lip is formed in a top portion of said of said baffle member and positioned adjacent to said ring gear.

11. The final drive unit as defined in claim 10, wherein said baffle member is formed integrally with said baffle wall and said deflector lip as a unitary single-piece part.

12. The final drive unit as defined in claim 9, wherein said baffle member including a baffle wall provided to cover a lower portion of said oil supply passage for storing a portion of said amount of said lubrication oil within said oil supply passage so as to permit said lubricating oil to lubricate said outside and inside bearings even when said carrier housing is tilted to a maximum angle of inclination with respect to a horizon, said maximum angle being a critical angle for stability of said motor vehicle on a slope, said baffle member further including an access opening allowing lubricating oil flow from said main chamber in said carrier housing into said oil supply passage.

13. The final drive unit as defined in claim 9, wherein said baffle member further including an access opening provided between said deflector lip and said baffle wall for providing a fluid communication between said main chamber of said carrier housing and said oil supply passage through said supply opening.

14. The final drive unit as defined in claim 9, further including at least one lateral opening providing fluid communication between said oil supply passage and a space within said final drive housing.

15. The final drive unit as defined in claim 14, further including a first lateral opening providing fluid communication between said oil supply passage and a space within said final drive housing between said outer roller bearing and an outer end thereof and a second lateral opening providing fluid communication between said oil supply passage and said space within said final drive housing between said outer roller bearing and said inner roller bearing.

16. A final drive unit for a motor vehicle axle assembly, said final drive unit comprising:
   a carrier housing integrally formed with a final drive housing and defining a main chamber provided to store an amount of lubricating oil therein;
   a ring gear disposed within said main chamber of said carrier housing for rotation therewithin and causing said lubricating oil to circulate when rotated;
   a pinion drive shaft rotatably supported within said final drive housing by a pair of axially spaced outside and inside bearings;
   an oil supply passage formed integrally with said final drive housing for lubricating said outside and inside bearings, said oil supply passage having a supply opening in communication with said main chamber of said carrier housing;
   a first lateral opening providing fluid communication between said oil supply passage and a space within said final drive housing between said outer roller bearing and an outer end thereof and a second lateral opening providing fluid communication between said oil supply passage and said space within said final drive housing between said outer roller bearing and said inner roller bearing; and
   a baffle member mounted within said carrier housing adjacent to said supply opening of said oil supply passage, said baffle member including a baffle wall provided to cover a lower portion of said oil supply passage for storing a portion of said amount of said lubrication oil within said oil supply passage so as to permit said lubricating oil to continuously and adequately lubricate said outside and inside bearings even when said motor vehicle is tilted to a maximum angle of inclination with respect to a horizon, said maximum angle being a critical angle for stability of said motor vehicle on a slope, said baffle member further including an access opening allowing lubricating oil flow from said main chamber in said carrier housing into said oil supply passage through said supply opening;
   said baffle member further including a deflector lip formed in a top portion of said baffle member and extending from said baffle member toward said ring gear, said deflector lip positioned adjacent to said ring gear and provided for deflecting said lubricating oil axially outward from said ring gear toward said access opening of said oil supply passage;
   said access opening in said baffle member is formed between said deflector lip and said baffle wall;
   said baffle member is formed integrally with said baffle wall and said deflector lip as a unitary single-piece part.

* * * * *